US012669351B2

(12) United States Patent
Wang et al.

(10) Patent No.: US 12,669,351 B2
(45) Date of Patent: Jun. 30, 2026

(54) OPTICAL SENSING ASSEMBLY AND ENCODER UTILIZING VERNIER EFFECT AND MULTI-STAGE POSITION SYNTHESIS

(71) Applicant: DELTA ELECTRONICS, INC., Taoyuan City (TW)

(72) Inventors: Horng-Jou Wang, Taoyuan City (TW); Jeng-Ping Lin, Taoyuan City (TW); Syuan-Ren Lin, Taoyuan City (TW); Chieh-Huang Lu, Taoyuan City (TW); Chun-Hao Huang, Taoyuan City (TW)

(73) Assignee: DELTA ELECTRONICS, INC., Taoyuan City (TW)

( * ) Notice: Subject to any disclaimer, the term of this patent is extended or adjusted under 35 U.S.C. 154(b) by 58 days.

(21) Appl. No.: 18/644,711

(22) Filed: Apr. 24, 2024

(65) Prior Publication Data

US 2025/0264345 A1 Aug. 21, 2025

(30) Foreign Application Priority Data

Feb. 20, 2024 (CN) .......................... 202410188326.5

(51) Int. Cl.
*G01D 5/347* (2006.01)

(52) U.S. Cl.
CPC ..... *G01D 5/34715* (2013.01); *G01D 5/34792* (2013.01); *G01D 5/34794* (2021.05); *G01D 5/3473* (2013.01); *G01D 5/34746* (2013.01)

(58) Field of Classification Search
CPC ........... G01D 5/34715; G01D 5/34794; G01D 5/3473; G01D 5/34746; G01D 5/34792
See application file for complete search history.

(56) References Cited

U.S. PATENT DOCUMENTS

| | | | |
|---|---|---|---|
| 5,666,196 A | 9/1997 | Ishii et al. | |
| 7,368,705 B2 | 5/2008 | Hare et al. | |
| 7,608,813 B1 | 10/2009 | Milvich et al. | |
| 8,618,467 B2 | 12/2013 | Horiguchi | |
| 11,002,562 B2 | 5/2021 | Wang et al. | |
| 2014/0195193 A1* | 7/2014 | Tamiya | G01D 5/34794 |
| | | | 702/150 |

(Continued)

FOREIGN PATENT DOCUMENTS

| | | |
|---|---|---|
| CN | 102047078 | 9/2012 |
| CN | 104748774 A | 7/2015 |
| JP | H09-196705 A | 7/1997 |

(Continued)

*Primary Examiner* — Jennifer D Bennett

(74) *Attorney, Agent, or Firm* — CKC & Partners Co., LLC

(57) ABSTRACT

An optical sensing assembly includes a scale, a sensor, and a light source. The scale includes first and second pattern areas. The first pattern area includes first patterns periodically arranged in first and second directions. The second pattern area includes second patterns periodically arranged in the first and second directions. The sensor is configured to move relative to the scale in the first direction and includes first, second, third, and fourth sensing areas. The first and third sensing areas are configured to sense changes of the first pattern area in the first and second directions respectively. The second and fourth sensing areas are configured to sense changes of the second pattern area in the first and second directions respectively. The light source is configured to emit light toward the scale.

18 Claims, 15 Drawing Sheets

(56) References Cited

U.S. PATENT DOCUMENTS

2015/0323352 A1 * 11/2015 Nagura ............. G01D 5/24485
                                                250/231.1
2022/0065668 A1 * 3/2022 Mitterleitner ...... G01D 5/34746

FOREIGN PATENT DOCUMENTS

| JP | 2000275065 A | * 10/2000 | ............... G01D 5/38 |
| JP | 4433759 | 3/2010 | |
| JP | 2011-516822 A | 5/2011 | |
| JP | 2015-215241 A | 12/2015 | |
| JP | WO2015/147319 A1 | 4/2017 | |
| JP | 2022-24542 A | 2/2022 | |
| TW | I673940 | 10/2019 | |
| TW | M645944 | 9/2023 | |

* cited by examiner

111a

P1'

P1

P3

G1

C1

D1

D2

111b

P2'

P2

P4

G2

C2

D1

D2

112a

A1+

A1+ B1+

A1-

A1- B1-

D1

D2

112b

A2+   B2+

A2+

A2-   B2-

D1

D2

112c

A3+
B3+
A3-
B3-

112d

A4+

B4+

A4-

B4-

D1

D2

OPTICAL SENSING ASSEMBLY AND ENCODER UTILIZING VERNIER EFFECT AND MULTI-STAGE POSITION SYNTHESIS

CROSS-REFERENCE TO RELATED APPLICATION

This application claims priority to China Application Serial Number 202410188326.5, filed Feb. 20, 2024, which is herein incorporated by reference.

BACKGROUND

Technical Field

The present disclosure relates to an optical sensing assembly and an encoder.

Description of Related Art

With the advancement of technology, encoder technology is widely used in precision instrument control fields such as motor speed measurement and position detection. For example, absolute encoders can be used to detect the rotational speed, rotation direction, and rotation position of the motor.

In the conventional technology, optical encoders often use gray code or M code to obtain absolute position information, and their main architectures include light transmitters, light receivers, code disks, and processing circuits. Among them, the light emitter and light receiver of a reflective optical encoder are arranged on the same side relative to the code disk, and the required signal output is obtained by appropriately designing the pattern on the code disk.

However, since the conventional architectures of encoder and encoding method are very sensitive to positional deviations, the encoders need to be extremely precise in assembly and alignment. Moreover, as the demand for encoder accuracy increases, the sensing area of the corresponding light receiver has also been greatly reduced. As a result, external environmental pollution such as oil, dirt, and particulates will have a serious impact on the sensing of absolute position signals.

Accordingly, how to develop an optical sensing assembly and an encoder using the same that are different from the previous ones to improve the problems and shortcomings of the conventional technology, to achieve high-precision absolute position sensing, to have a higher ability to withstand environmental pollution, and to enhance the robustness of the encoder becomes an important issue to be solved by those in the industry.

SUMMARY

An aspect of the disclosure is to provide an optical sensing assembly and an encoder to solve the foregoing problems.

According to an embodiment of the disclosure, an optical sensing assembly includes a scale, a sensor, and a light source. The scale includes a first pattern area and a second pattern area. The first pattern area includes a plurality of first patterns periodically arranged in a first direction and a second direction. The second pattern area includes a plurality of second patterns periodically arranged in the first direction and the second direction. The sensor is configured to move relative to the scale in the first direction and includes a first sensing area, a second sensing area, a third sensing area, and a fourth sensing area. The first sensing area is configured to sense a change of the first pattern area in the first direction. The second sensing area is configured to sense a change of the second pattern area in the first direction. The third sensing area is configured to sense a change of the first pattern area in the second direction. The fourth sensing area is configured to sense a change of the second pattern area in the second direction. The light source is configured to emit light toward the scale.

In one or more embodiments of the present disclosure, the first patterns arranged along the first direction are gradually shifted in the second direction.

In one or more embodiments of the present disclosure, the first patterns are arranged in a plurality of columns. The columns have a pitch in the first direction. The first patterns in each of the columns have another pitch in the second direction. After passing a distance of M times the pitch along the first direction, the columns are gradually shifted in the second direction by a distance of the another pitch. M is an integer greater than 2.

In one or more embodiments of the present disclosure, when the sensor moves a distance of M times the pitch in the first direction relative to the scale, the first sensing area generates M periodic signals and the third sensing area generates one periodic signal.

In one or more embodiments of the present disclosure, the second patterns arranged along the first direction are gradually shifted in the second direction.

In one or more embodiments of the present disclosure, the second patterns are arranged in a plurality of columns. The columns have a pitch in the first direction. The second patterns in each of the columns have another pitch in the second direction. After passing a distance of N times the pitch along the first direction, the columns are gradually shifted in the second direction by a distance of the another pitch. N is an integer greater than 2.

In one or more embodiments of the present disclosure, when the sensor moves a distance of N times the pitch in the first direction relative to the scale, the second sensing area generates N periodic signals and the third sensing area generates one periodic signal.

In one or more embodiments of the present disclosure, sensing units of each of the first sensing area, the second sensing area, the third sensing area, and the fourth sensing area are arranged into a phased-array.

According to an embodiment of the disclosure, an encoder includes an optical sensing assembly and a signal processing unit. The optical sensing assembly includes a scale and a sensor. The scale includes a first pattern area and a second pattern area. The first pattern area includes a plurality of first patterns periodically arranged in a first direction and a second direction. The second pattern area includes a plurality of second patterns periodically arranged in the first direction and the second direction. The sensor is configured to move relative to the scale in the first direction and includes a first sensing area, a second sensing area, a third sensing area, and a fourth sensing area. The first sensing area is configured to sense a change of the first pattern area in the first direction and accordingly generate a first sensing position signal. The second sensing area is configured to sense a change of the second pattern area in the first direction and accordingly generate a second sensing position signal. The third sensing area is configured to sense a change of the first pattern area in the second direction and accordingly generate a third sensing position signal. The fourth sensing area is configured to sense a change of the second pattern area in the second direction and accordingly generate a fourth sensing position signal. The signal processing unit is connected to the sensor and configured to: calculate a first sensing position information, a second sensing position information, a third sensing position information, and a fourth sensing position information respectively from the first sensing position signal, the second sensing position signal, the third sensing position signal, and the fourth sensing position signal; generate a first synthesized position information according to the first sensing position information and the second sensing position information; generate a second synthesized position information according to the third sensing position information and the first synthesized position information; generate a third synthesized position information according to the fourth sensing position information and the first synthesized position information; and generate a fourth synthesized position information according to the second synthesized position information and the third synthesized position information.

In one or more embodiments of the present disclosure, the first patterns arranged along the first direction are gradually shifted in the second direction.

In one or more embodiments of the present disclosure, the first patterns are arranged in a plurality of columns. The columns have a pitch in the first direction. The first patterns in each of the columns have another pitch in the second direction. After passing a distance of M times the pitch along the first direction, the columns are gradually shifted in the second direction by a distance of the another pitch. M is an integer greater than 2.

In one or more embodiments of the present disclosure, when the sensor moves a distance of M times the pitch in the first direction relative to the scale, the first sensing area generates M periodic signals and the third sensing area generates one periodic signal.

In one or more embodiments of the present disclosure, the second patterns arranged along the first direction are gradually shifted in the second direction.

In one or more embodiments of the present disclosure, the second patterns are arranged in a plurality of columns. The columns have a pitch in the first direction. The second patterns in each of the columns have another pitch in the second direction. After passing a distance of N times the pitch along the first direction, the columns are gradually shifted in the second direction by a distance of the another pitch. N is an integer greater than 2.

In one or more embodiments of the present disclosure, when the sensor moves a distance of N times the pitch in the first direction relative to the scale, the second sensing area generates N periodic signals and the third sensing area generates one periodic signal.

In one or more embodiments of the present disclosure, sensing units of each of the first sensing area, the second sensing area, the third sensing area, and the fourth sensing area are arranged into a phased-array.

In one or more embodiments of the present disclosure, the signal processing unit is configured to use the first sensing position information and the second sensing position information to calculate the first synthesized position information based on Vernier effect.

In one or more embodiments of the present disclosure, the signal processing unit is configured to use the third sensing position information and the first synthesized position information to calculate the second synthesized position information based on Vernier effect.

In one or more embodiments of the present disclosure, the signal processing unit is configured to use the fourth sensing position information and the first synthesized position information to calculate the third synthesized position information based on Vernier effect.

In one or more embodiments of the present disclosure, the signal processing unit is configured to use the second synthesized position information and the third synthesized position information to calculate the fourth synthesized position information based on Vernier effect.

Accordingly, in the optical sensing assembly of the present disclosure, the scale includes two pattern areas and the sensor includes four sensing areas. Two of the sensing areas are configured to sense one of the pattern areas, and the other two of the sensing areas are configured to sense the other one of the pattern areas. Since the scale only includes two pattern areas, the optical sensing assembly only requires a smaller area for sensing, thereby increasing the mechanism assembly margin. Moreover, the sensing units in each of the sensing areas are arranged in a phased-array, so the sensing areas have higher resistance to environmental pollution and better assembly positioning margin, thereby enhancing the robustness of the encoder. In addition, the encoding and decoding of the encoder using this optical sensing assembly uses four sets of incremental position signals and Vernier effect, so high-precision absolute position sensing can be achieved.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
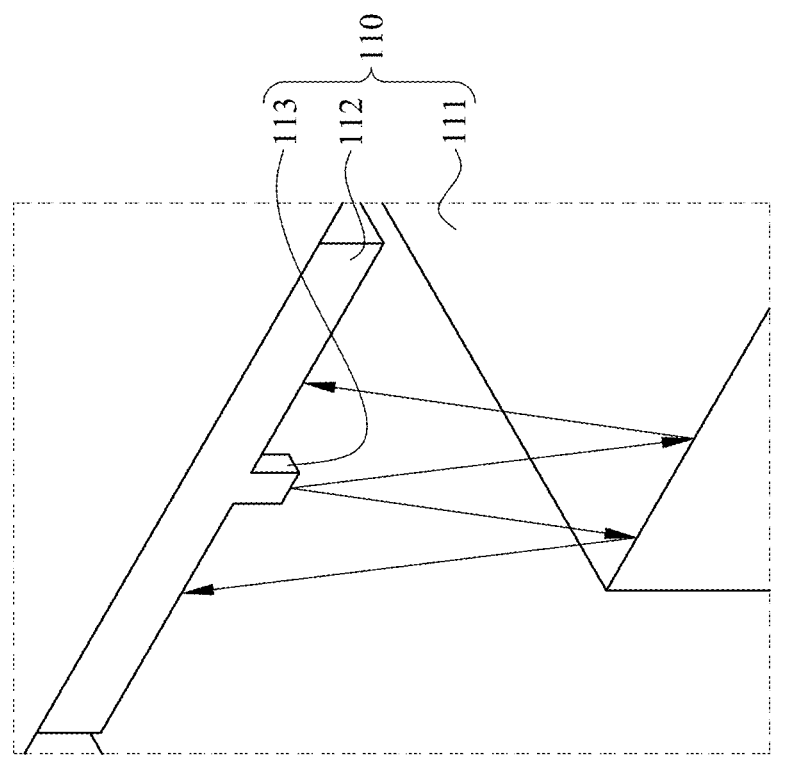
FIG. 1 is a partial perspective view of an encoder according to an embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Reference is made to FIG. 1. FIG. 1 is a partial perspective view of an encoder 100 according to an embodiment of the present disclosure. As shown in FIG. 1, in the present embodiment, the encoder 100 includes an optical sensing assembly 110. The optical sensing assembly 110 includes a scale 111, a sensor 112, and a light source 113. The scale 111 and the sensor 112 are disposed relative to each other and can be displaced relative to each other. For example, the scale 111 can move linearly or rotate relative to the sensor 112. The light source 113 is disposed on a side of the sensor 112 facing the scale 111 and is configured to emit light toward the scale 111. The sensor 112 is configured to receive and sense the light reflected by the scale 111.

Figure 2:
FIG. 2 is a partial schematic diagram of a scale in FIG. 1.
Figure 3:
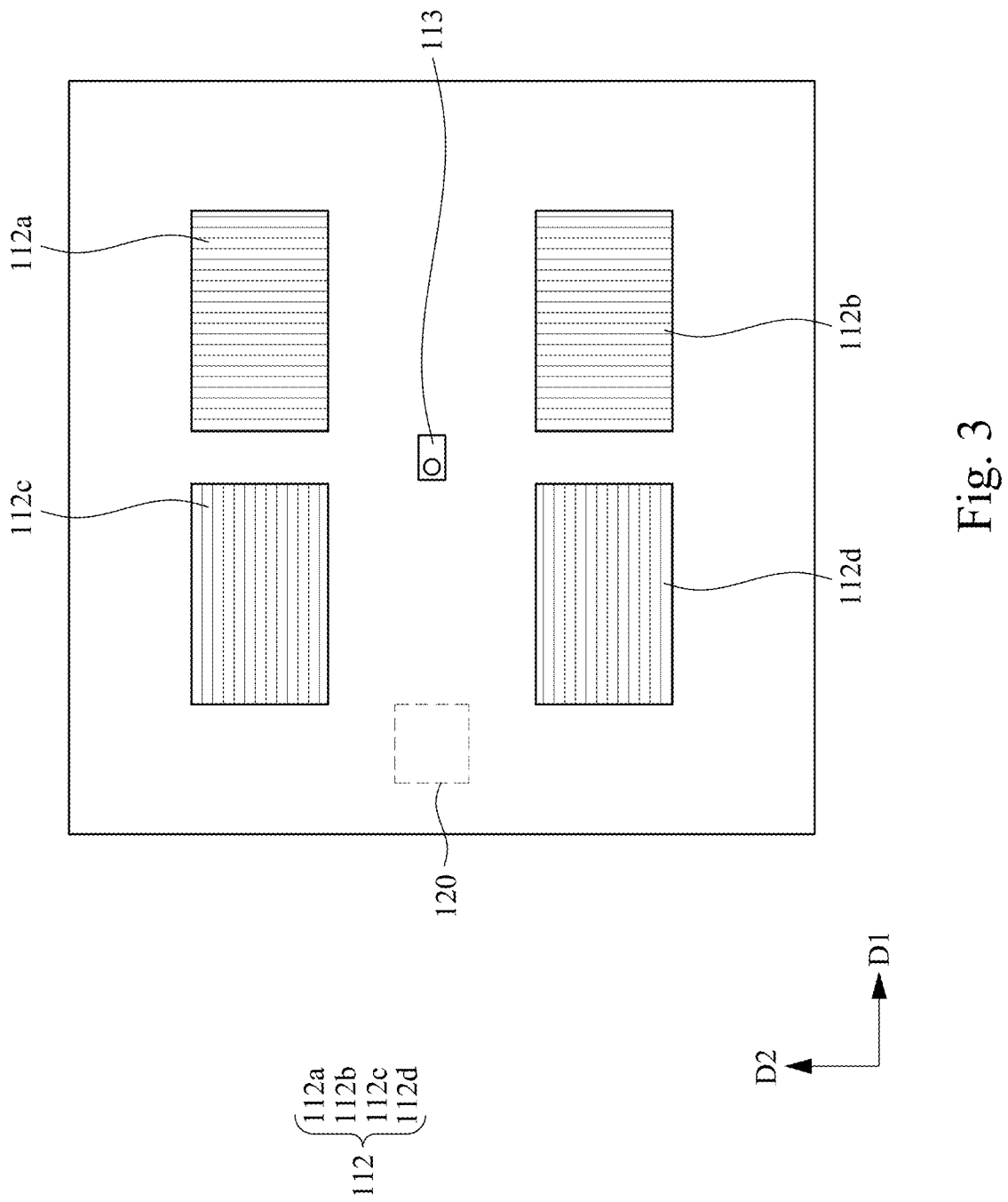
FIG. 3 is a schematic diagram of a sensor, a light source, and a signal processing unit in FIG. 1.

Reference is made to FIG. 2 and FIG. 3. FIG. 2 is a partial schematic diagram of the scale 111 in FIG. 1. FIG. 3 is a schematic diagram of the sensor 112, the light source 113, and a signal processing unit 120 in FIG. 1. As shown in FIG. 2 and FIG. 3, in the present embodiment, the scale 111 includes a first pattern area 111a and a second pattern area 111b. The first pattern area 111a and the second pattern area 111b extend in a first direction D1 and are arranged in a second direction D2. The first direction D1 and the second direction D2 are perpendicular to each other. The sensor 112 is configured to move relative to the scale 111 in the first direction D1 and includes a first sensing area 112a, a second sensing area 112b, a third sensing area 112c, and a fourth sensing area 112d. The first sensing area 112a is configured to sense a change of the first pattern area 111a in the first direction D1. The second sensing area 112b is configured to sense a change of the second pattern area 111b in the first direction D1. The third sensing area 112c is configured to sense a change of the first pattern area 111a in the second direction D2. The fourth sensing area 112d is configured to sense a change of the second pattern area 111b in the second direction D2.

In some embodiments where the encoder 100 is linear, the first direction D1 is X direction and the second direction D2 is Y direction. In some embodiments where the encoder 100 is rotary, the first direction D1 is the circumferential (Θ) direction and the second direction D2 is the radial (R) direction.

Figure 4:
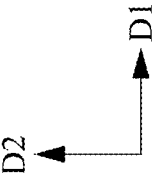
FIG. 4 is a partial schematic diagram of a first pattern area of the scale according to an embodiment of the present disclosure.

Reference is made to FIG. 4. FIG. 4 is a partial schematic diagram of a first pattern area 111a of the scale 111 according to an embodiment of the present disclosure. As shown in FIG. 4, in the present embodiment, the first pattern area 111a of the scale 111 includes a plurality of first patterns G1 periodically arranged in the first direction D1 and the second direction D2. Specifically, the first patterns G1 are arranged in a plurality of columns C1. The columns C1 have a first pitch P1 in the first direction D1. The first patterns G1 in each of the columns C1 have another pitch P1' in the second direction D2. In other words, the first patterns G1 of the first pattern area 111a constitute a two-dimensional pattern.

In the present embodiment, the shape of each of the first patterns G1 is square, but the disclosure is not limited thereto. In some embodiments, the scale 111 adopts a reflective structure, so the first patterns G1 are high-reflective areas, and the area outside the first patterns G1 is a low-reflective area. In some embodiments, the scale 111 adopts a transmissive structure, so the first patterns G1 are high light-transmitting areas, and the area outside the first patterns G1 is a low light-transmitting area.

In particular, the first patterns G1 arranged along the first direction D1 are gradually shifted in the second direction D2. Specifically, as shown in FIG. 4, after passing a distance of M times the first pitch P1 along the first direction D1, the columns C1 are gradually shifted in the second direction D2 by a distance of the another pitch P1'. M is an integer greater than 2. In other words, each of the first patterns G1 has a third pitch P3 in the first direction D1, and the third pitch P3 is M times the first pitch P1. Correspondingly, when the sensor 112 moves a distance of M times the first pitch P1 in the first direction D1 relative to the scale 111, the first sensing area 112a generates M periodic signals and the third sensing area 112c generates one periodic signal.

In some embodiments, M is an integer greater than 2. For example, as shown in FIG. 4, N is 12 (That is, the columns C1 will be gradually shifted by a distance of one pitch P1' in the second direction D2 after passing a distance of 12 times the first pitch P1 along the first direction D1), but the disclosure is not limited thereto.

Figure 5:
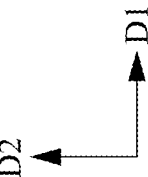
FIG. 5 is a partial schematic diagram of a second pattern area of the scale according to an embodiment of the present disclosure.

Reference is made to FIG. 5. FIG. 5 is a partial schematic diagram of a second pattern area 111b of the scale 111 according to an embodiment of the present disclosure. As shown in FIG. 5, in the present embodiment, the second pattern area 111b of the scale 111 includes a plurality of second patterns G2 periodically arranged in the first direction D1 and the second direction D2. Specifically, the second patterns G2 are arranged in a plurality of columns C2. The columns C2 have a second pitch P2 in the first direction D1. The second patterns G2 in each of the columns C2 have another pitch P2' in the second direction D2. In other words, the second patterns G2 of the second pattern area 111b constitute a two-dimensional pattern.

In the present embodiment, the shape of each of the second patterns G2 is square, but the disclosure is not limited thereto. In some embodiments, the scale 111 adopts a reflective structure, so the second patterns G2 are high-reflective areas, and the area outside the second patterns G2 is a low-reflective area. In some embodiments, the scale 111 adopts a transmissive structure, so the second patterns G2 are high light-transmitting areas, and the area outside the second patterns G2 is a low light-transmitting area.

In particular, the second patterns G2 arranged along the first direction D1 are gradually shifted in the second direction D2. Specifically, as shown in FIG. 5, after passing a distance of N times the second pitch P2 along the first direction D1, the columns C2 are gradually shifted in the second direction D2 by a distance of the another pitch P2'. N is an integer greater than 2. In other words, each of the second patterns G2 has a fourth pitch P4 in the first direction D1, and the fourth pitch P4 is N times the second pitch P2. Correspondingly, when the sensor 112 moves a distance of N times the second pitch P2 in the first direction D1 relative to the scale 111, the second sensing area 112b generates N periodic signals and the fourth sensing area 112d generates one periodic signal.

Through the aforementioned structural configurations, during the relative movement of the sensor 112 and the scale 111 in the first direction D1, the sensor 112 can use the first sensing area 112a and the third sensing area 112c to simultaneously to sense the first pattern area 111a and use the second sensing area 112b and the fourth sensing area 112d to simultaneously sense the second pattern area 111b. Since the scale 111 only includes two pattern areas, the optical sensing assembly 110 only requires a smaller area for sensing, thereby increasing the mechanical assembly margin.

In some embodiments, N is an integer greater than 2. For example, as shown in FIG. 5, N is 12 (That is, the columns C2 will be gradually shifted by a distance of one pitch P2' in the second direction D2 after passing a distance of 12 times the second pitch P2 along the first direction D1), but the disclosure is not limited thereto.

Figure 6:
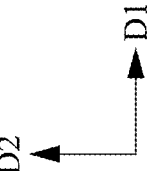
FIG. 6 is a partial schematic diagram of a first sensing area of the sensor according to an embodiment of the present disclosure.
Figure 7:
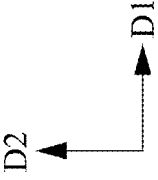
FIG. 7 is a partial schematic diagram of a second sensing area of the sensor according to an embodiment of the present disclosure.
Figure 8:
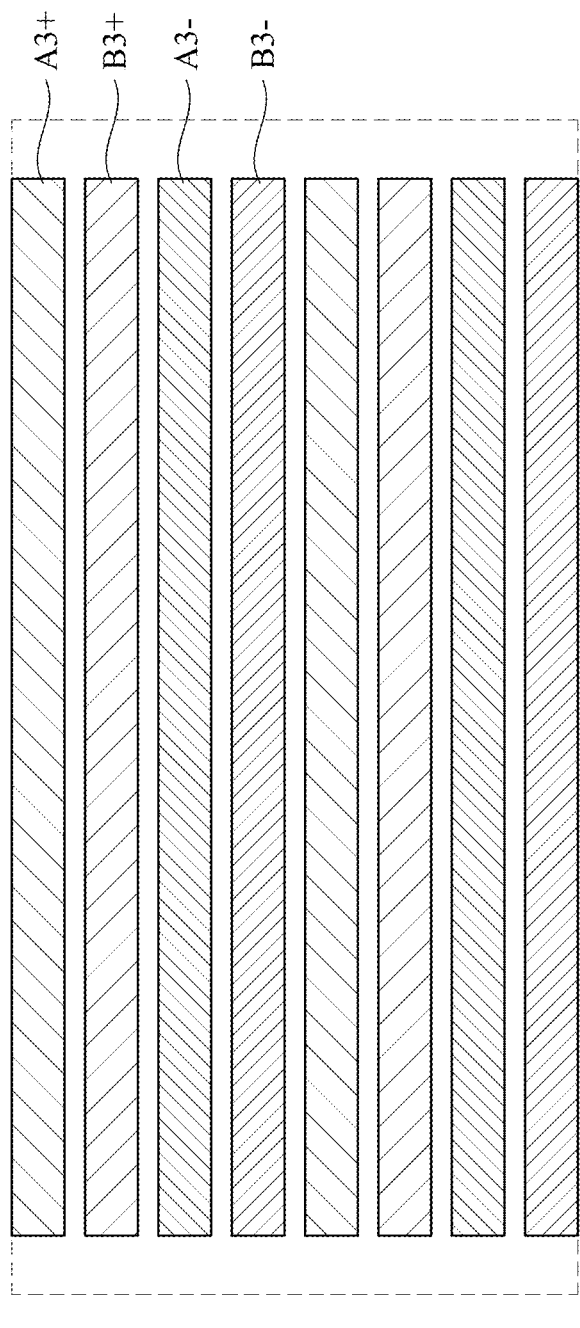
FIG. 8 is a partial schematic diagram of a third sensing area of the sensor according to an embodiment of the present disclosure.
Figure 8:
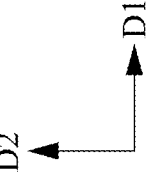
Figure 9:
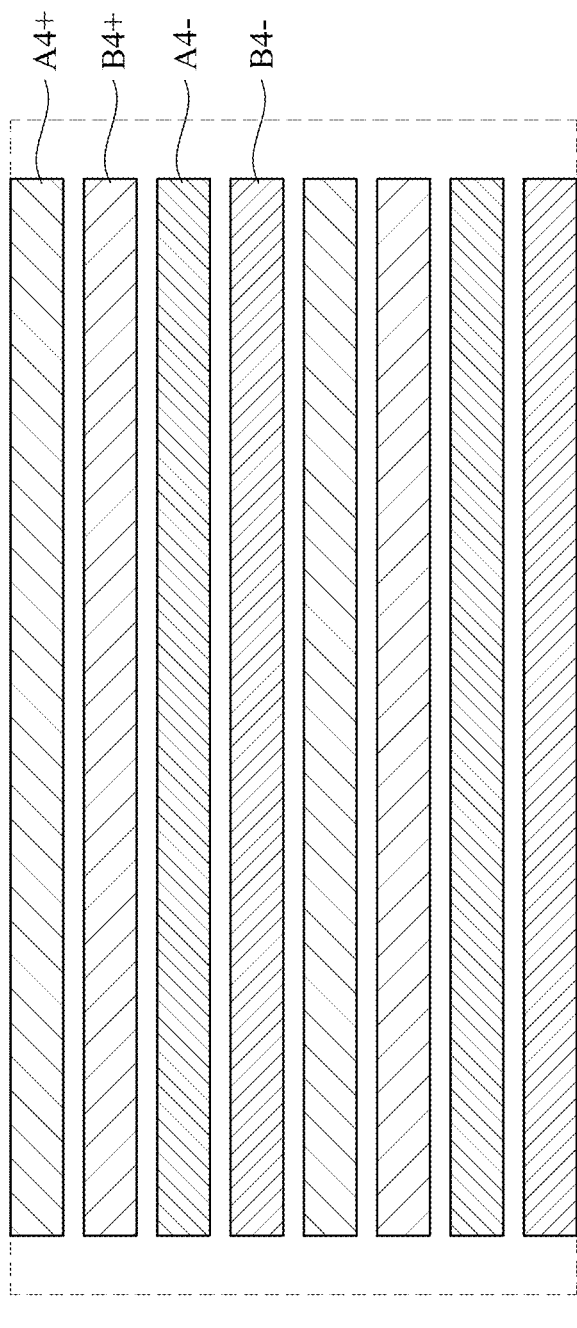
FIG. 9 is a partial schematic diagram of a fourth sensing area of the sensor according to an embodiment of the present disclosure.
Figure 9:
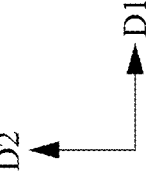

Reference is made to FIG. 6, FIG. 7, FIG. 8, and FIG. 9. FIG. 6 is a partial schematic diagram of the first sensing area 112a of the sensor 112 according to an embodiment of the present disclosure. FIG. 7 is a partial schematic diagram of the second sensing area 112b of the sensor 112 according to an embodiment of the present disclosure. FIG. 8 is a partial schematic diagram of the third sensing area 112c of the sensor 112 according to an embodiment of the present disclosure. FIG. 9 is a partial schematic diagram of the fourth sensing area 112d of the sensor 112 according to an embodiment of the present disclosure. As shown in FIGS. 6 to 9, the first sensing area 112a includes a plurality of sensing units A1+, B1+, A1−, B1− arranged into a phased-array. The second sensing area 112b includes a plurality of sensing units A2+, B2+, A2−, B2− arranged into a phased-array. The third sensing area 112c includes a plurality of sensing units A3+, B3+, A3−, B3− arranged into a phased-array. The fourth sensing area 112d includes a plurality of sensing units A4+, B4+, A4−, B4− arranged into a phased-array. Specifically, the sensing units A1+, B1+, A1−, B1− of the first sensing area 112a adopt a periodic phase array arrangement in the first direction D1. That is, the interleaved arrangement of the sensing unit A1+, the sensing unit B1+, the sensing unit A1−, and the sensing unit B1− in sequence is repeated for a plurality of cycles. The sensing units A2+, B2+, A2−, B2− of the second sensing area 112b adopt a periodic phase array arrangement in the first direction D1. That is, the interleaved arrangement of the sensing unit A2+, the sensing unit B2+, the sensing unit A2−, and the sensing unit B2− in sequence is repeated for a plurality of cycles. The sensing units A3+, B3+, A3−, B3− of the third sensing area 112c adopt a periodic phase array arrangement in the second direction D2. That is, the interleaved arrangement of the sensing unit A3+, the sensing unit B3+, the sensing unit A3−, and the sensing unit B3− in sequence is repeated for a plurality of cycles. The sensing units A4+, B4+, A4−, B4− of the fourth sensing area 112d adopt a periodic phase array arrangement in the second direction D2. That is, the interleaved arrangement of the sensing unit A4+, the sensing unit B4+, the sensing unit A4−, and the sensing unit B4− in sequence is repeated for a plurality of cycles. By adopting the phased-array arrangement, the first sensing area 112a, the second sensing area 112b, the third sensing area 112c, and the fourth sensing area 112d can have higher resistance to environmental pollution and better assembly positioning margin, thereby enhancing the robustness of the encoder 100.

Figure 10:
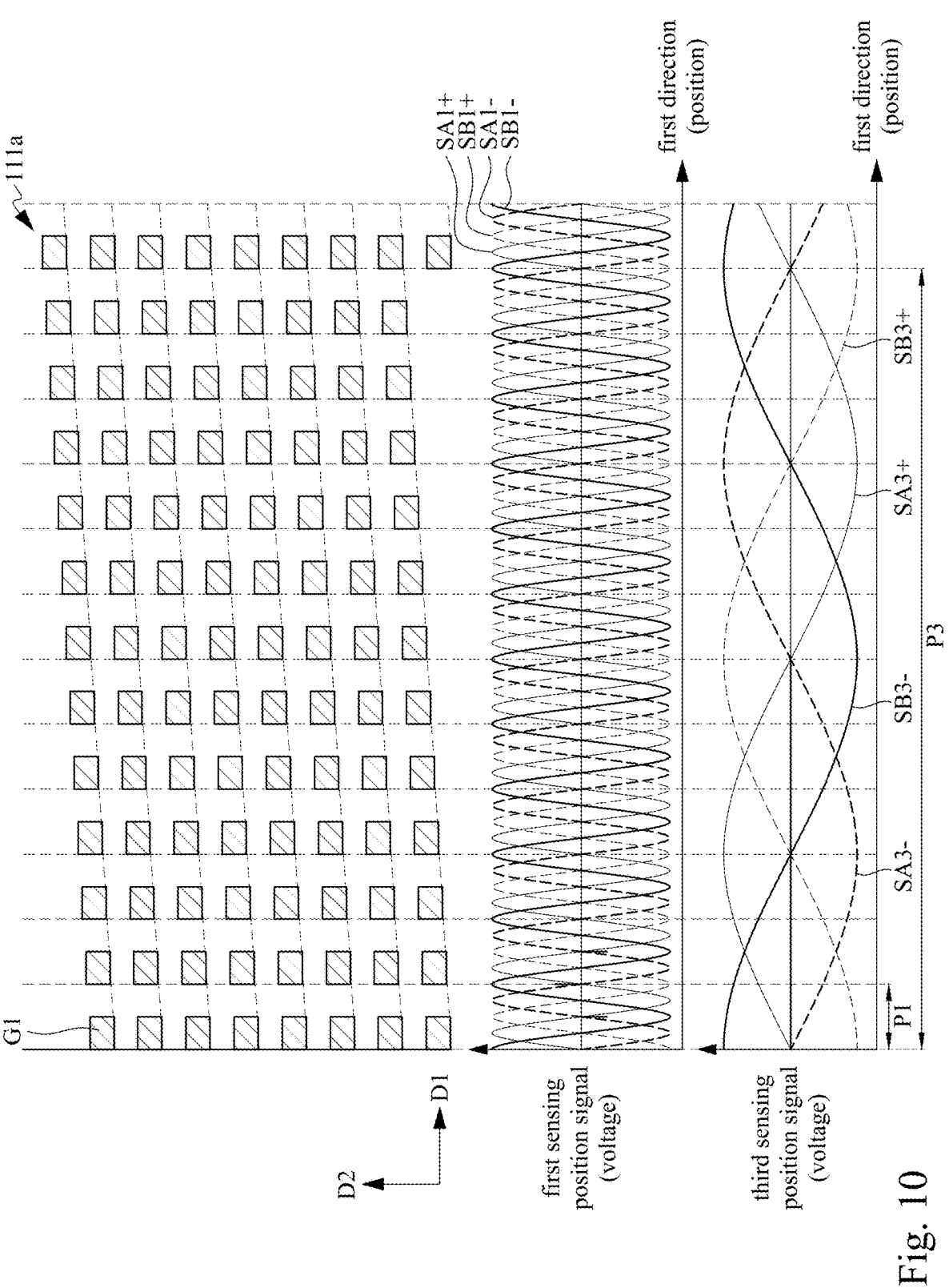
FIG. 10 is a schematic diagram illustrating a first sensing position signal and a third sensing position signal obtained by sensing the first pattern area using the first sensing area and the third sensing area respectively.

Reference is made to FIG. 10. FIG. 10 is a schematic diagram illustrating a first sensing position signal and a third sensing position signal obtained by sensing the first pattern area 111a using the first sensing area 112a and the third sensing area 112c respectively. As shown in FIG. 10, in the present embodiment, after sensing a change of the first pattern area 111a in the first direction D1, the first sensing area 112a will correspondingly generate the first sensing position signal. In detail, the sensing units A1+, B1+, A1−, B1− of the first sensing area 112a will generate first sensing position signals SA1+, SB1+, SA1−, SB1− respectively. After sensing a change of the first pattern area 111a in the second direction D2, the third sensing area 112c will correspondingly generate the third sensing position signal. In detail, the sensing units A3+, B3+, A3−, B3− of the third sensing area 112c will generate third sensing position signals SA3+, SB3+, SA3−, SB3− respectively.

As shown in FIG. 3, in the present embodiment, the encoder 100 further includes a signal processing unit 120 (shown in dashed lines). The signal processing unit 120 is connected to the sensor 112 and configured to process the first sensing position signals SA1+, SB1+, SA1−, SB1− generated by the first sensing area 112a and the third sensing position signals SA3+, SB3+, SA3−, SB3− generated by the third sensing area 112c. In the present embodiment, the signal processing unit 120 is integrated with the sensor 112, but the disclosure is not limited thereto. In practical applications, the signal processing unit 120 and the sensor 112 may not be integrated together and connected through additional components.

Figure 11:
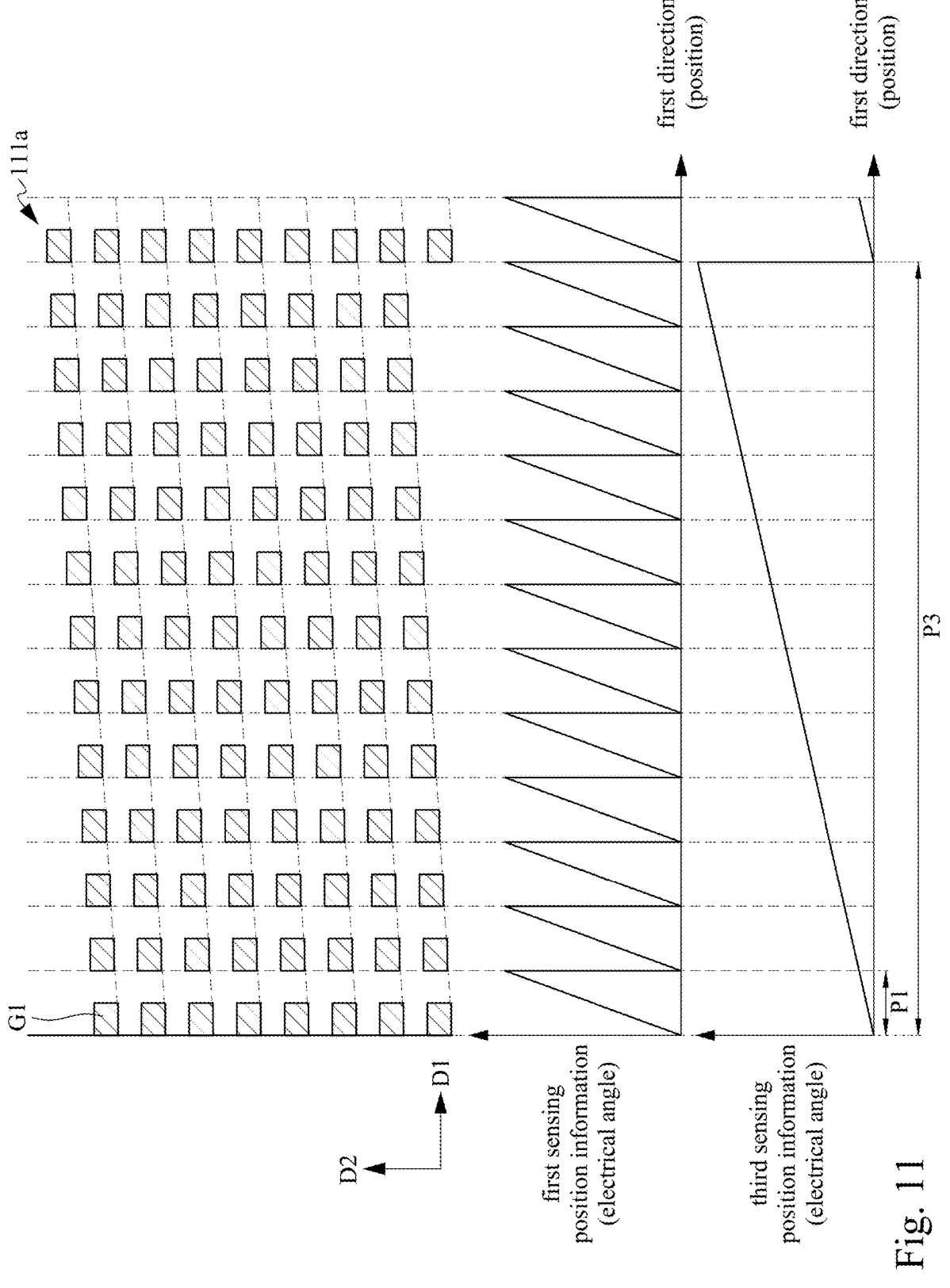
FIG. 11 is a schematic diagram illustrating a first sensing position information and a third sensing position information calculated from the first sensing position signal and the third sensing position signal respectively.

Reference is made to FIG. 11. FIG. 11 is a schematic diagram illustrating a first sensing position information and a third sensing position information calculated from the first sensing position signal and the third sensing position signal respectively. In the present embodiment, the signal processing unit 120 is configured to calculate the first sensing position information (as shown in FIG. 11) from the first sensing position signals SA1+, SB1+, SA1−, SB1− (as shown in FIG. 10). For example, the first sensing position information can be calculated through an arctangent function (i.e., ATAN function). The first sensing position information also has the first pitch P1. In addition, the signal processing unit 120 is further configured to calculate the third sensing position information (as shown in FIG. 11) from the third sensing position signals SA3+, SB3+, SA3−, SB3− (as shown in FIG. 10). For example, the third sensing position information can be calculated through an arctangent function. The third sensing position information also has the third pitch P3.

Figure 12:
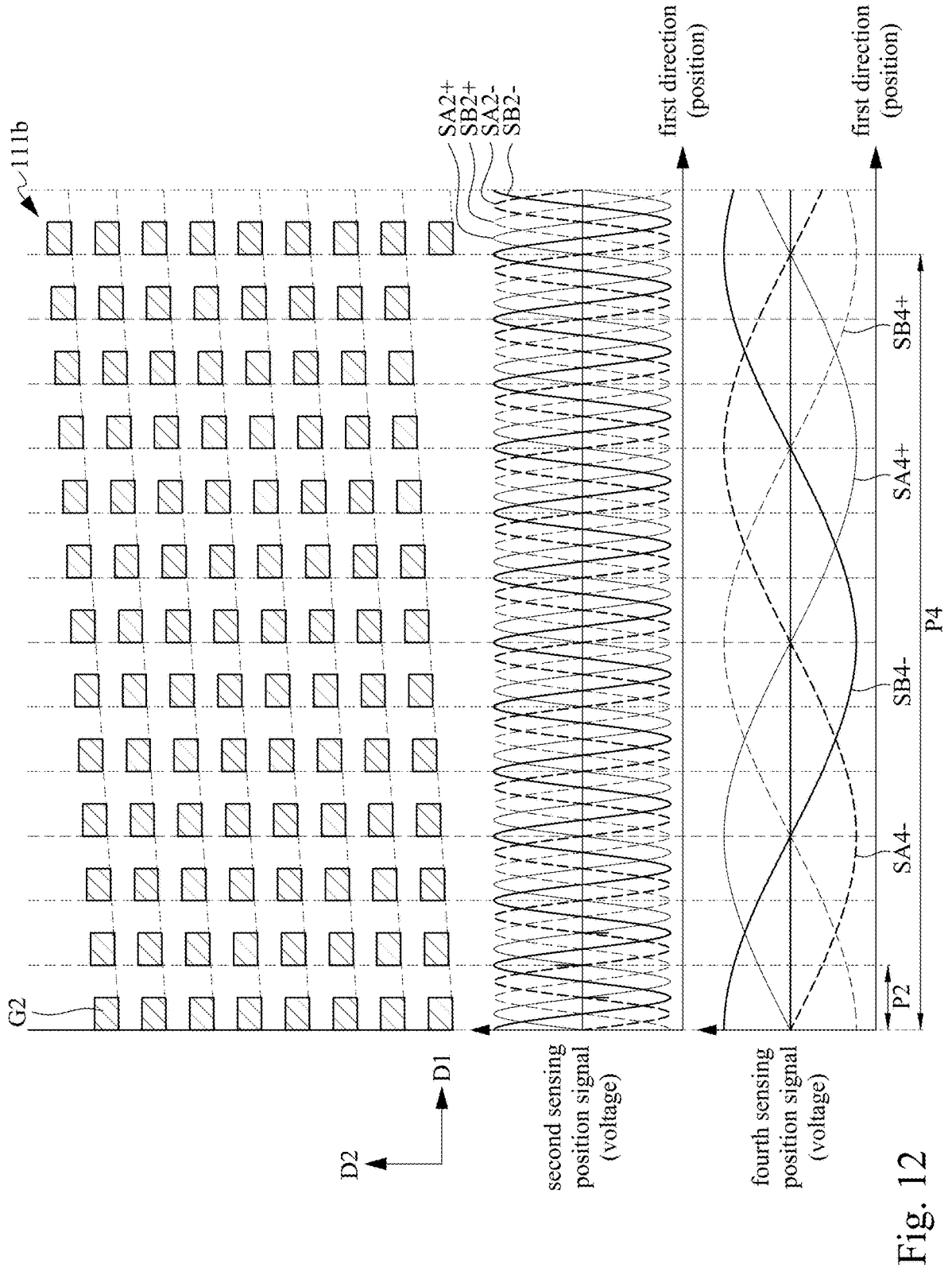
FIG. 12 is a schematic diagram illustrating a second sensing position signal and a fourth sensing position signal obtained by sensing the second pattern area using the second sensing area and the fourth sensing area respectively.

Reference is made to FIG. 12. FIG. 12 is a schematic diagram illustrating a second sensing position signal and a fourth sensing position signal obtained by sensing the second pattern area 111b using the second sensing area 112b and the fourth sensing area 112d respectively. As shown in FIG. 12, in the present embodiment, after sensing a change of the second pattern area 111b in the first direction D1, the second sensing area 112b will correspondingly generate the second sensing position signal SA2+, SB2+, SA2−, SB2−. After sensing a change of the second pattern area 111b in the second direction D2, the fourth sensing area 112d will correspondingly generate the fourth sensing position signal SA4+, SB4+, SA4−, SB4−.

Figure 13:
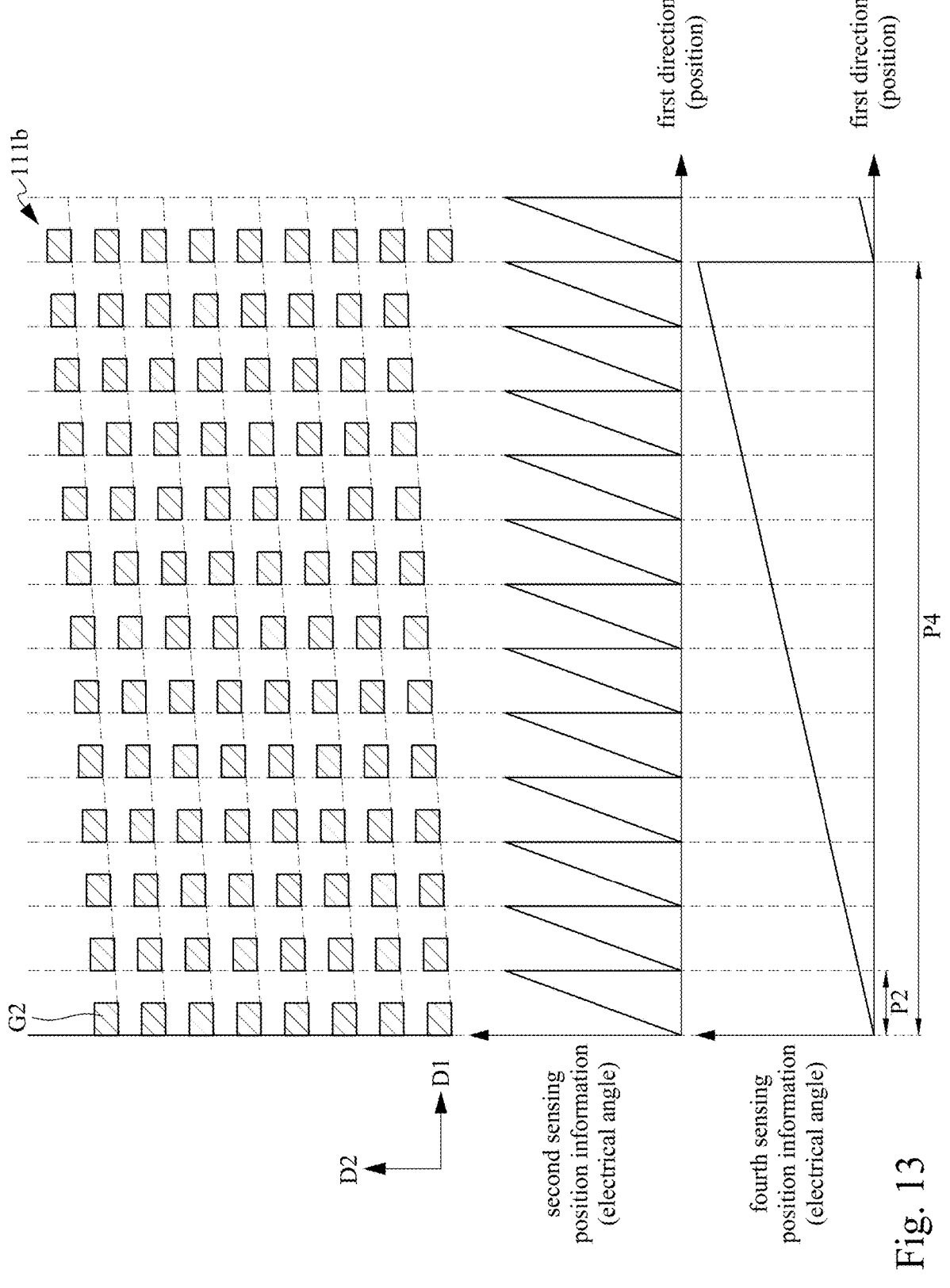
FIG. 13 is a schematic diagram illustrating a second sensing position information and a fourth sensing position information calculated from the second sensing position signal and the fourth sensing position signal respectively.

Reference is made to FIG. 13. FIG. 13 is a schematic diagram illustrating a second sensing position information and a fourth sensing position information calculated from the second sensing position signal and the fourth sensing position signal respectively. In the present embodiment, the signal processing unit 120 is further configured to calculate the second sensing position information (as shown in FIG. 13) from the second sensing position signals SA2+, SB2+, SA2−, SB2− (as shown in FIG. 12). For example, the second sensing position information can be calculated through an arctangent function. The second sensing position information also has the second pitch P2. In addition, the signal processing unit 120 is further configured to calculate the fourth sensing position information (as shown in FIG. 13) from the fourth sensing position signals SA4+, SB4+, SA4−, SB4− (as shown in FIG. 12). For example, the fourth sensing position information can be calculated through an arctangent function. The fourth sensing position information also has the fourth pitch P4.

In the present embodiment, the signal processing unit 120 is further configured to generate a first synthesized position information according to the first sensing position information and the second sensing position information, generate a second synthesized position information according to the third sensing position information and the first synthesized position information; generate a third synthesized position information according to the fourth sensing position information and the first synthesized position information; and generate a fourth synthesized position information according to the second synthesized position information and the third synthesized position information. Specifically, the signal processing unit 120 is configured to use the first sensing position information and the second sensing position information to calculate the first synthesized position information based on Vernier effect. The signal processing unit 120 is further configured to use the third sensing position information and the first synthesized position information to calculate the second synthesized position information based on Vernier effect. The signal processing unit 120 is further configured to use the fourth sensing position information and the first synthesized position information to calculate the third synthesized position information based on Vernier effect. The signal processing unit 120 is further configured to use the second synthesized position information and the third synthesized position information to calculate the fourth synthesized position information based on Vernier effect. The principle of Vernier effect is briefly described as follows.

Figures 14A, 14B, 14C, 14D:
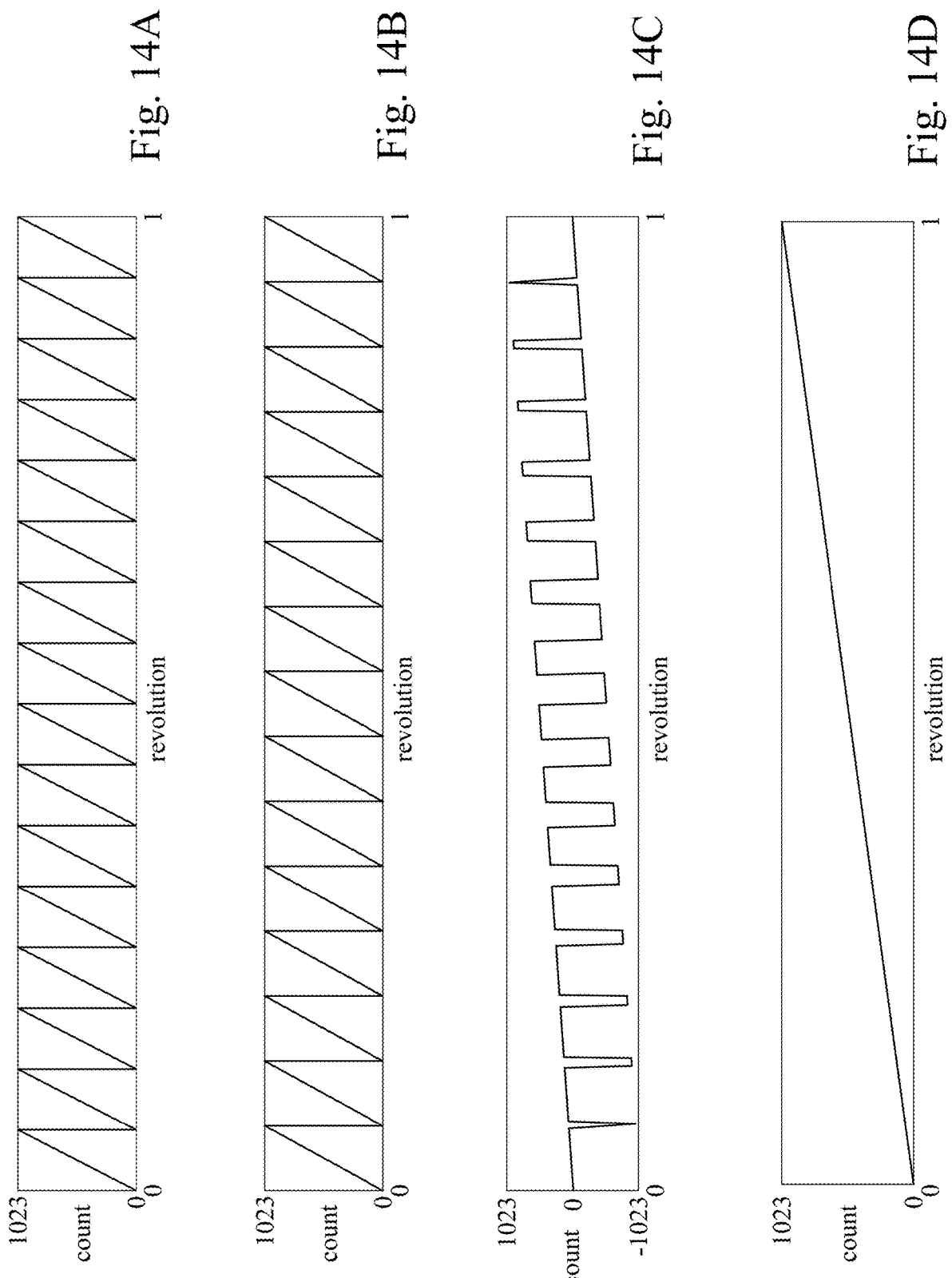
FIG. 14A is a schematic diagram of a 16-period signal.
FIG. 14B is a schematic diagram of a 15-period signal.
FIG. 14C is a schematic diagram of a difference signal between the 16-period signal and the 15-period signal.
FIG. 14D is a schematic diagram of the difference signal in FIG. 13C in the form of unsigned 10-bit data.

Reference is made to FIG. 14A, FIG. 14B, FIG. 14C, and FIG. 14D. FIG. 14A is a schematic diagram of a 16-period signal. FIG. 14B is a schematic diagram of a 15-period signal. FIG. 14C is a schematic diagram of a difference signal between the 16-period signal and the 15-period signal. FIG. 14D is a schematic diagram of the difference signal in FIG. 14C in the form of unsigned 10-bit data. As shown in FIGS. 14A to 14D, after subtracting the 15-period signal in FIG. 14B from the 16-period signal in FIG. 14A, the difference signal in FIG. 14C can be obtained. Further, by converting the difference signal in FIG. 14C into the unsigned 10-bit data form, the single period signal shown in FIG. 14D can be obtained.

In some embodiments where the encoder 100 is linear, N is equal to M+1. The first synthesized position information has a first synthesized pitch PS1. The second pitch P2 of the second sensing position information is (M−1)/M times the first pitch P1 of the first sensing position information, such that the first synthesized pitch PS1 is (M−1) times the first pitch P1 or M times the second pitch P2. M is an integer greater than 2.

In some embodiments where the encoder 100 is linear, the second synthesized position information has a second synthesized pitch PS2. The first synthesized pitch PS1 is (M−1)/M times the third pitch P3, such that the second synthesized pitch PS2 is (M−1) times the third pitch P3 or M times the first synthesized pitch PS1. M is an integer greater than 2.

In some embodiments where the encoder 100 is linear, the third synthesized position information has a third synthesized pitch PS3. The first synthesized pitch PS1 is M/(M+1) times the fourth pitch P4, such that the third synthesized pitch PS3 is M times the fourth pitch P4 or (M+1) times the first synthesized pitch PS1. M is an integer greater than 2.

In some embodiments where the encoder 100 is linear, the fourth synthesized position information has a fourth synthesized pitch PS4. The third synthesized pitch PS3 is (M+1)/M times the second synthesized pitch PS2, such that the fourth synthesized pitch PS4 is (M+1) times the second synthesized pitch PS2 or (M+1) times the third synthesized pitch PS3. M is an integer greater than 2.

For example, under the conditions that M is 32, the first pitch P1 is 64 μm, the second pitch P2 is 62 μm, the third pitch P3 is 2,048 μm, and the fourth pitch P4 is 2,046 μm, the signal processing unit 120 can generate the first synthesized position information with the first synthesized pitch PS1 of 1,984 μm, the second synthesized position information with the second synthesized pitch PS2 of 63,488 μm, the third synthesized position information with the third synthesized pitch PS3 of 65,472 μm, and the fourth synthesized position information with the fourth synthesized pitch PS4 of 2,095,104 μm.

For example, under the conditions that M is 64, the first pitch P1 is 64 μm, the second pitch P2 is 63 μm, the third pitch P3 is 4,096 μm, and the fourth pitch P4 is 4,095 μm, the signal processing unit 120 can generate the first synthesized position information with the first synthesized pitch PS1 of 4,032 μm, the second synthesized position information with the second synthesized pitch PS2 of 258,048 μm, the third synthesized position information with the third synthesized pitch PS3 of 262,080 μm, and the fourth synthesized position information with the fourth synthesized pitch PS4 of 16,773,120 μm.

It should be noted that the fourth synthesized position information analyzed by the signal processing unit 120 can be used as preliminary absolute position information. The second synthesized position information or the third synthesized position information analyzed by the signal processing unit 120 can be used as low-precision position information. The third sensing position information, the fourth sensing position information, or the first synthesized position information analyzed by the signal processing unit 120 can be used as medium-precision position information. The first sensing position information or the second sensing position information can be used as high-precision position information.

Figure 15:
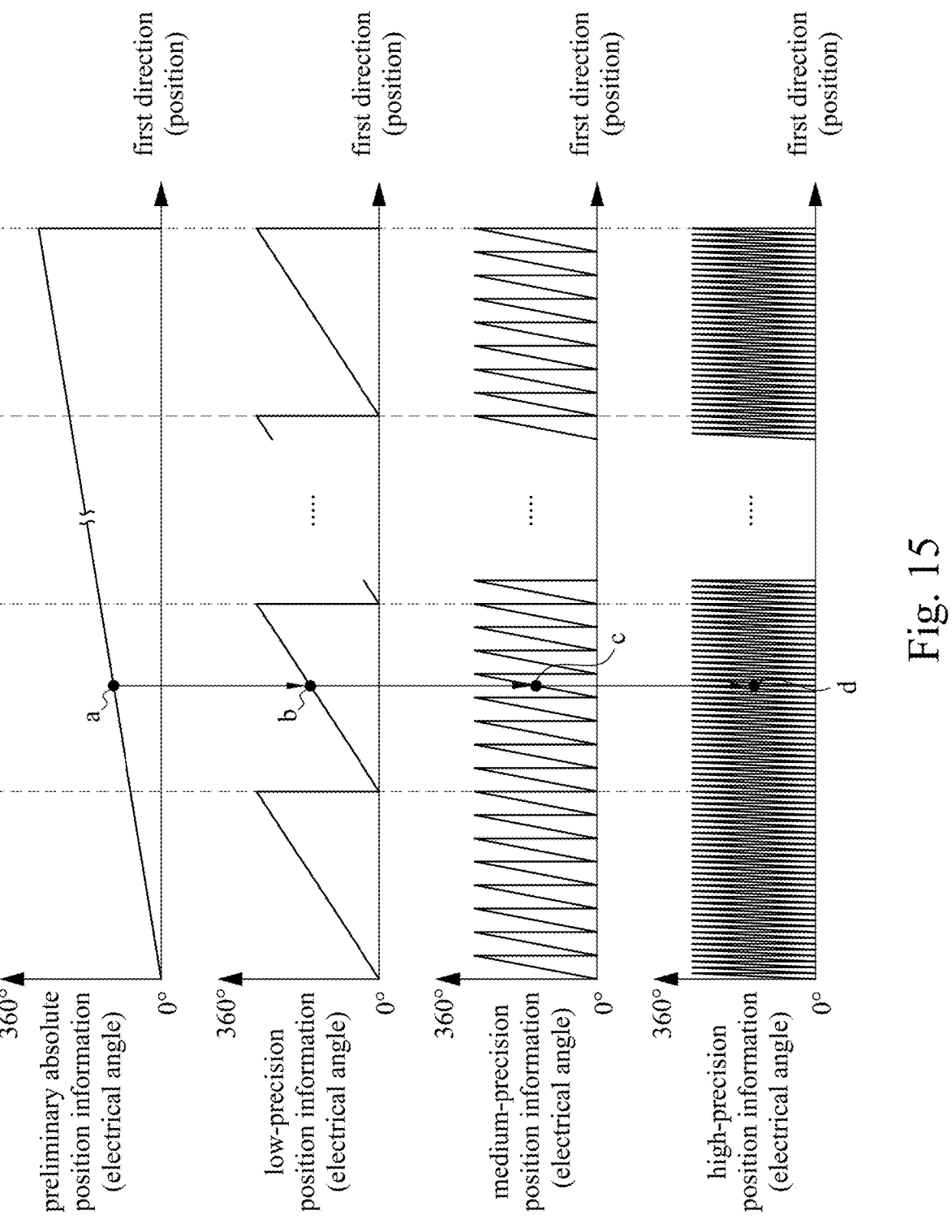
FIG. 15 is a schematic diagram illustrating a position information obtained by a position detection method of the encoder according to an embodiment of the present disclosure.

Reference is made to FIG. 15. FIG. 15 is a schematic diagram illustrating a position information obtained by a position detection method of the encoder 100 according to an embodiment of the present disclosure. As shown in FIG. 15, in the present embodiment, the signal processing unit 120 is further configured to analyze a first position a from the fourth synthesized position information (i.e., the preliminary absolute position information). The signal processing unit 120 is further configured to map the first position a to the second synthesized position information or the third synthesized position information (i.e., the low-precision position information) to analyze a second position b, which is the second cycle position as shown in the figure. The signal processing unit 120 is further configured to map the second position b to the third sensing position information, the fourth sensing position information, or the first synthesized position information (i.e., the medium-precision position information) to analyze a third position c, which is the fifth cycle position as shown in the figure. The signal processing unit 120 is further configured to map the third position c to the first sensing position information or the second sensing position information (i.e., the high-precision position information) to analyze a fourth position d, in which the fourth position d is a high-precision absolute position. This progressive position analyzing step maps an initial absolute position to a low-precision incremental position, maps the low-precision incremental position to a medium-precision incremental position, and maps the medium-precision incremental position to a high-precision incremental position, such that the analyzed position information is a high-precision absolute position. In this way, the encoder 100 of the present embodiment can realize high-precision absolute position sensing.

According to the foregoing recitations of the embodiments of the disclosure, it can be seen that in the optical sensing assembly of the present disclosure, the scale includes two pattern areas and the sensor includes four sensing areas. Two of the sensing areas are configured to sense one of the pattern areas, and the other two of the sensing areas are configured to sense the other one of the pattern areas. Since the scale only includes two pattern areas, the optical sensing assembly only requires a smaller area for sensing, thereby increasing the mechanism assembly margin. Moreover, the sensing units in each of the sensing areas are arranged in a phased-array, so the sensing areas have higher resistance to environmental pollution and better assembly positioning margin, thereby enhancing the robustness of the encoder. In addition, the encoding and decoding of the encoder using this optical sensing assembly uses four sets of incremental position signals and Vernier effect, so high-precision absolute position sensing can be achieved.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An optical sensing assembly, comprising:
a scale comprising:
   a first pattern area comprising a plurality of first patterns periodically arranged in a first direction and a second direction; and
   a second pattern area comprising a plurality of second patterns periodically arranged in the first direction and the second direction;
a sensor configured to move relative to the scale in the first direction and comprising:
   a first sensing area configured to sense a change of the first pattern area in the first direction;
   a second sensing area configured to sense a change of the second pattern area in the first direction;
   a third sensing area configured to sense a change of the first pattern area in the second direction; and
   a fourth sensing area configured to sense a change of the second pattern area in the second direction; and
a light source configured to emit light toward the scale,
wherein the first patterns arranged along the first direction are gradually shifted in the second direction, the first patterns are arranged in a plurality of columns, the columns have a pitch in the first direction, the first patterns in each of the columns have another pitch in the second direction, and after passing a distance of M times the pitch along the first direction, the columns are gradually shifted in the second direction by a distance of the another pitch, wherein M is an integer greater than 2.

2. The optical sensing assembly of claim 1, wherein when the sensor moves a distance of M times the pitch in the first direction relative to the scale, the first sensing area generates M periodic signals and the third sensing area generates one periodic signal.

3. The optical sensing assembly of claim 1, wherein the second patterns arranged along the first direction are gradually shifted in the second direction.

4. The optical sensing assembly of claim 3, wherein the second patterns are arranged in a plurality of columns, the columns have a pitch in the first direction, the second patterns in each of the columns have another pitch in the second direction, and after passing a distance of N times the pitch along the first direction, the columns are gradually shifted in the second direction by a distance of the another pitch, wherein N is an integer greater than 2.

5. The optical sensing assembly of claim 4, wherein when the sensor moves a distance of N times the pitch in the first direction relative to the scale, the second sensing area generates N periodic signals and the fourth sensing area generates one periodic signal.

6. The optical sensing assembly of claim 1, wherein sensing units of each of the first sensing area, the second sensing area, the third sensing area, and the fourth sensing area are arranged into a phased-array.

7. An encoder, comprising:
an optical sensing assembly comprising:
   a scale comprising:
      a first pattern area comprising a plurality of first patterns periodically arranged in a first direction and a second direction; and
      a second pattern area comprising a plurality of second patterns periodically arranged in the first direction and the second direction;
   a sensor configured to move relative to the scale in the first direction and comprising:

a first sensing area configured to sense a change of the first pattern area in the first direction and accordingly generate a first sensing position signal;

a second sensing area configured to sense a change of the second pattern area in the first direction and accordingly generate a second sensing position signal;

a third sensing area configured to sense a change of the first pattern area in the second direction and accordingly generate a third sensing position signal; and a fourth sensing area configured to sense a change of the second pattern area in the second direction and accordingly generate a fourth sensing position signal; and a signal processing unit connected to the sensor and configured to:

calculate a first sensing position information, a second sensing position information, a third sensing position information, and a fourth sensing position information respectively from the first sensing position signal, the second sensing position signal, the third sensing position signal, and the fourth sensing position signal;

generate a first synthesized position information according to the first sensing position information and the second sensing position information;

generate a second synthesized position information according to the third sensing position information and the first synthesized position information;

generate a third synthesized position information according to the fourth sensing position information and the first synthesized position information; and generate a fourth synthesized position information according to the second synthesized position information and the third synthesized position information.

8. The encoder of claim 7, wherein the first patterns arranged along the first direction are gradually shifted in the second direction.

9. The encoder of claim 8, wherein the first patterns are arranged in a plurality of columns, the columns have a pitch in the first direction, the second patterns in each of the columns have another pitch in the second direction, and after passing a distance of M times the pitch along the first direction, the columns are gradually shifted in the second direction by a distance of the another pitch, wherein M is an integer greater than 2.

10. The encoder of claim 9, wherein when the sensor moves a distance of M times the pitch in the first direction relative to the scale, the first sensing area generates M periodic signals and the third sensing area generates one periodic signal.

11. The encoder of claim 7, wherein the second patterns arranged along the first direction are gradually shifted in the second direction.

12. The encoder of claim 11, wherein the second patterns are arranged in a plurality of columns, the columns have a pitch in the first direction, the second patterns in each of the columns have another pitch in the second direction, and after passing a distance of N times the pitch along the first direction, the columns are gradually shifted in the second direction by a distance of the another pitch, wherein N is an integer greater than 2.

13. The encoder of claim 12, wherein when the sensor moves a distance of N times the pitch in the first direction relative to the scale, the second sensing area generates N periodic signals and the fourth sensing area generates one periodic signal.

14. The encoder of claim 7, wherein sensing units of each of the first sensing area, the second sensing area, the third sensing area, and the fourth sensing area are arranged into a phased-array.

15. The encoder of claim 7, wherein the signal processing unit is configured to use the first sensing position information and the second sensing position information to calculate the first synthesized position information based on Vernier effect.

16. The encoder of claim 7, wherein the signal processing unit is configured to use the third sensing position information and the first synthesized position information to calculate the second synthesized position information based on Vernier effect.

17. The encoder of claim 7, wherein the signal processing unit is configured to use the fourth sensing position information and the first synthesized position information to calculate the third synthesized position information based on Vernier effect.

18. The encoder of claim 7, wherein the signal processing unit is configured to use the second synthesized position information and the third synthesized position information to calculate the fourth synthesized position information based on Vernier effect.

* * * * *